July 7, 1970
C. T. BANKS
3,518,726
MACHINE FOR MAKING SANITARY NAPKINS
Filed Sept. 15, 1967
6 Sheets-Sheet 1
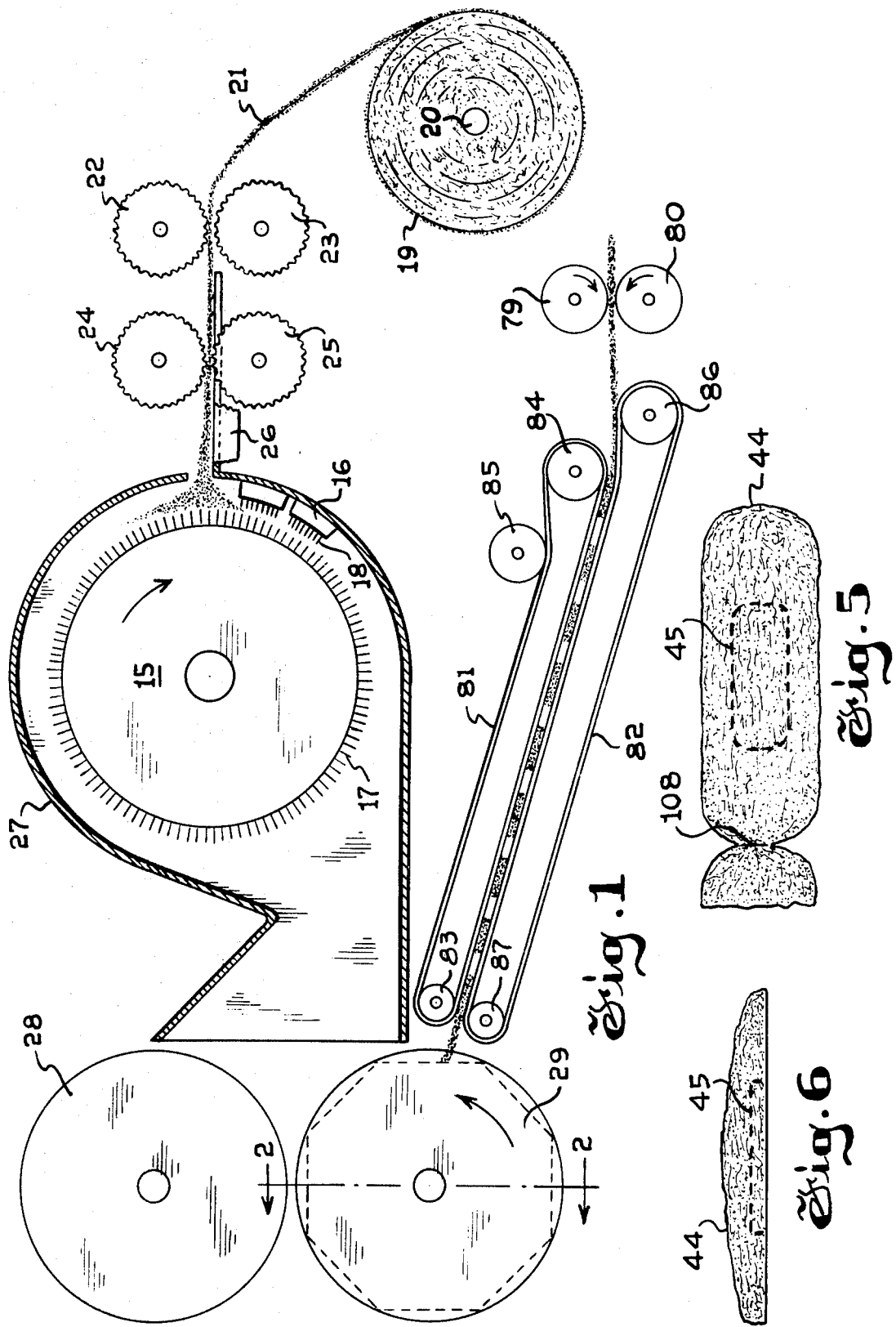

July 7, 1970 C. T. BANKS 3,518,726
MACHINE FOR MAKING SANITARY NAPKINS
Filed Sept. 15, 1967 6 Sheets-Sheet 2
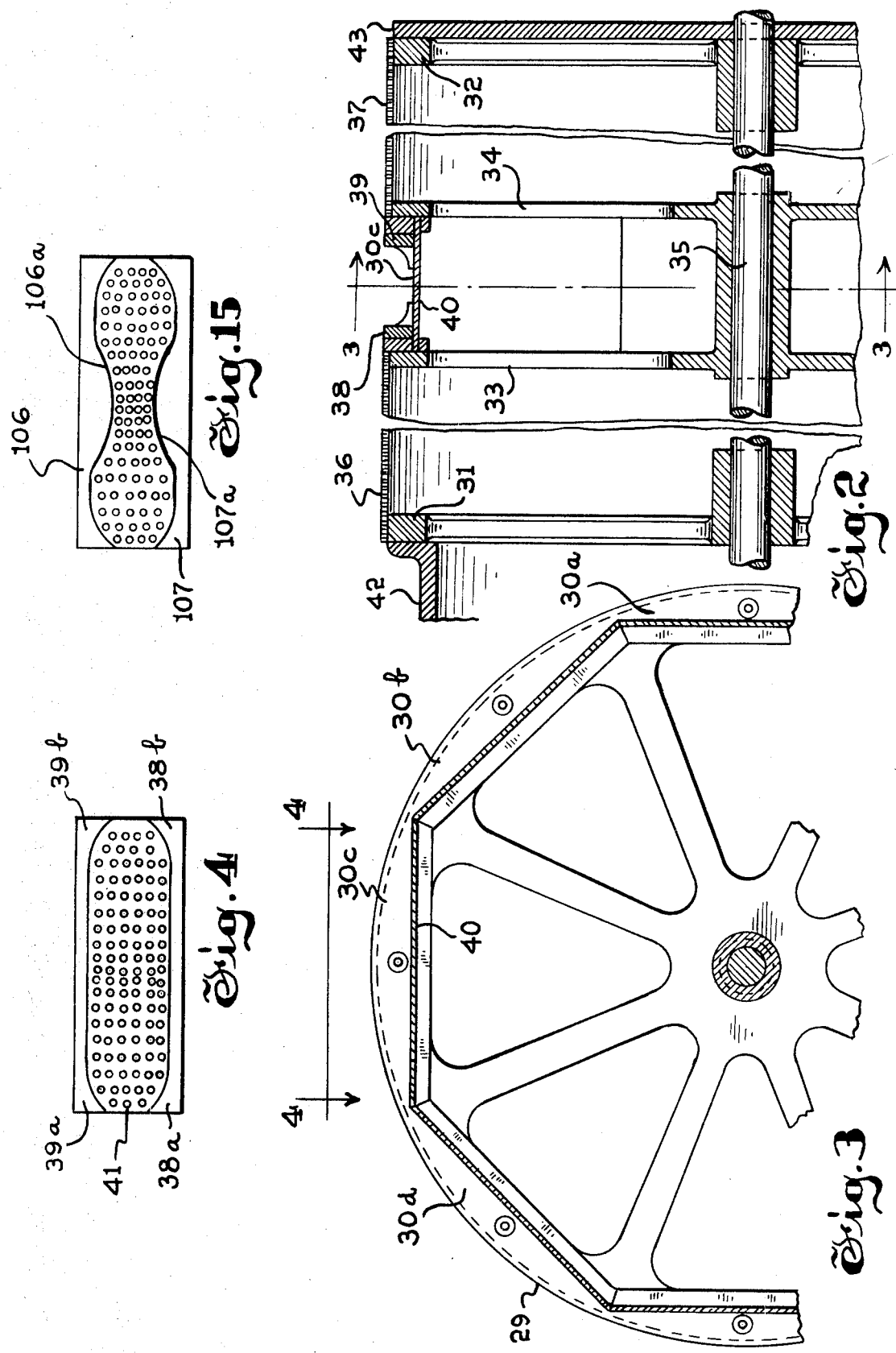

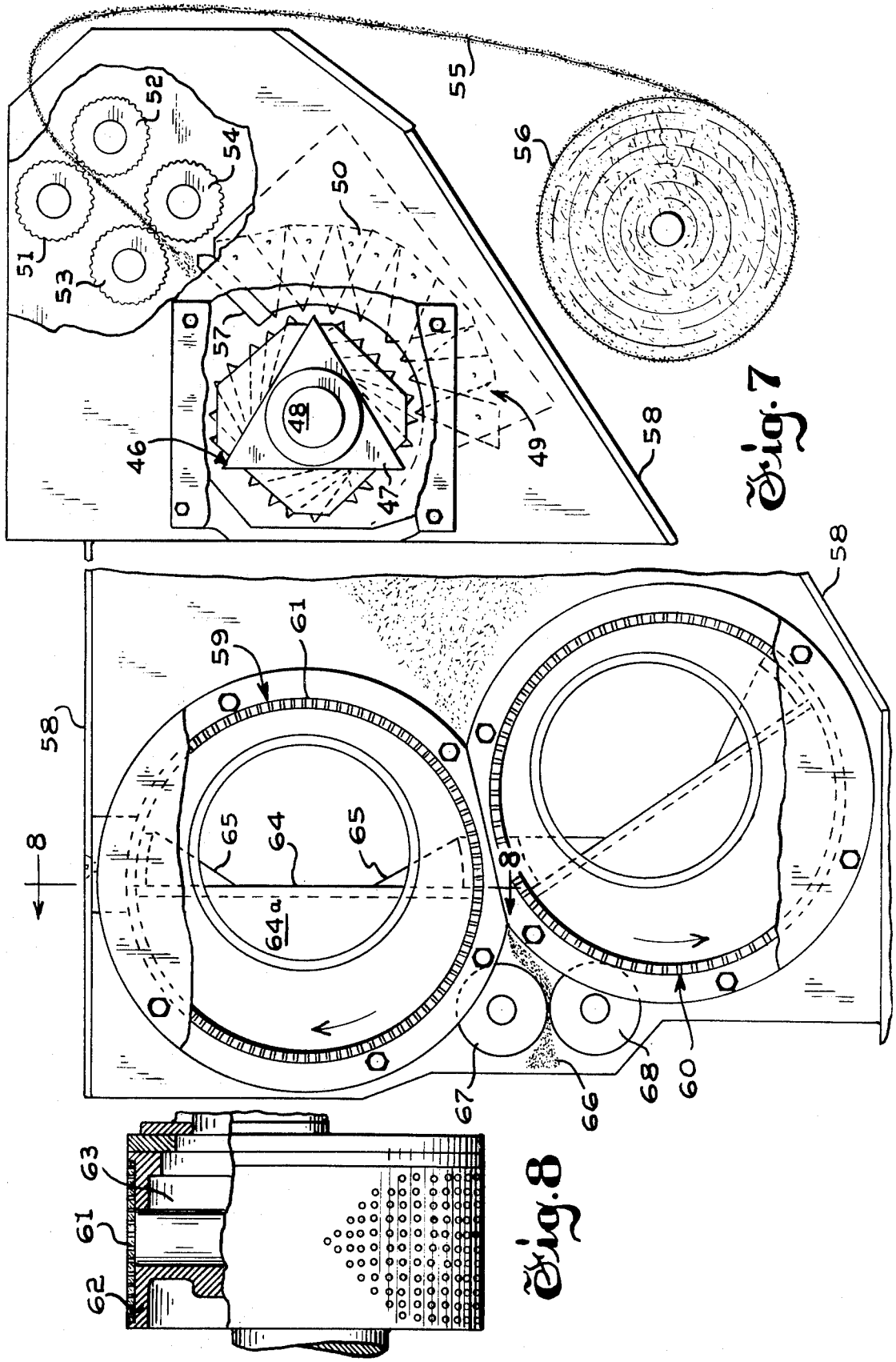

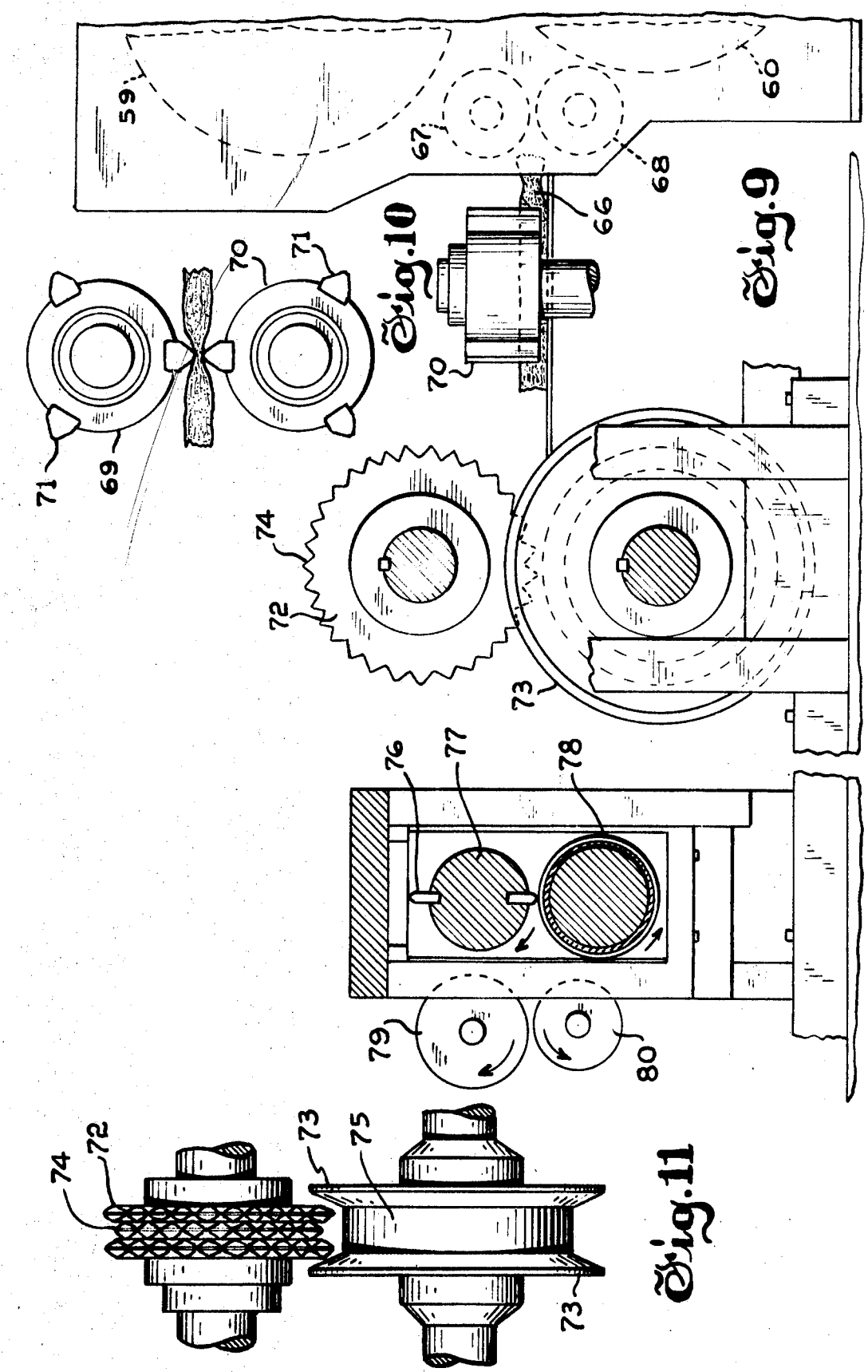

July 7, 1970　　　　　　　　　C. T. BANKS　　　　　　　3,518,726
MACHINE FOR MAKING SANITARY NAPKINS
Filed Sept. 15, 1967　　　　　　　　　　　　　　　　6 Sheets-Sheet 5
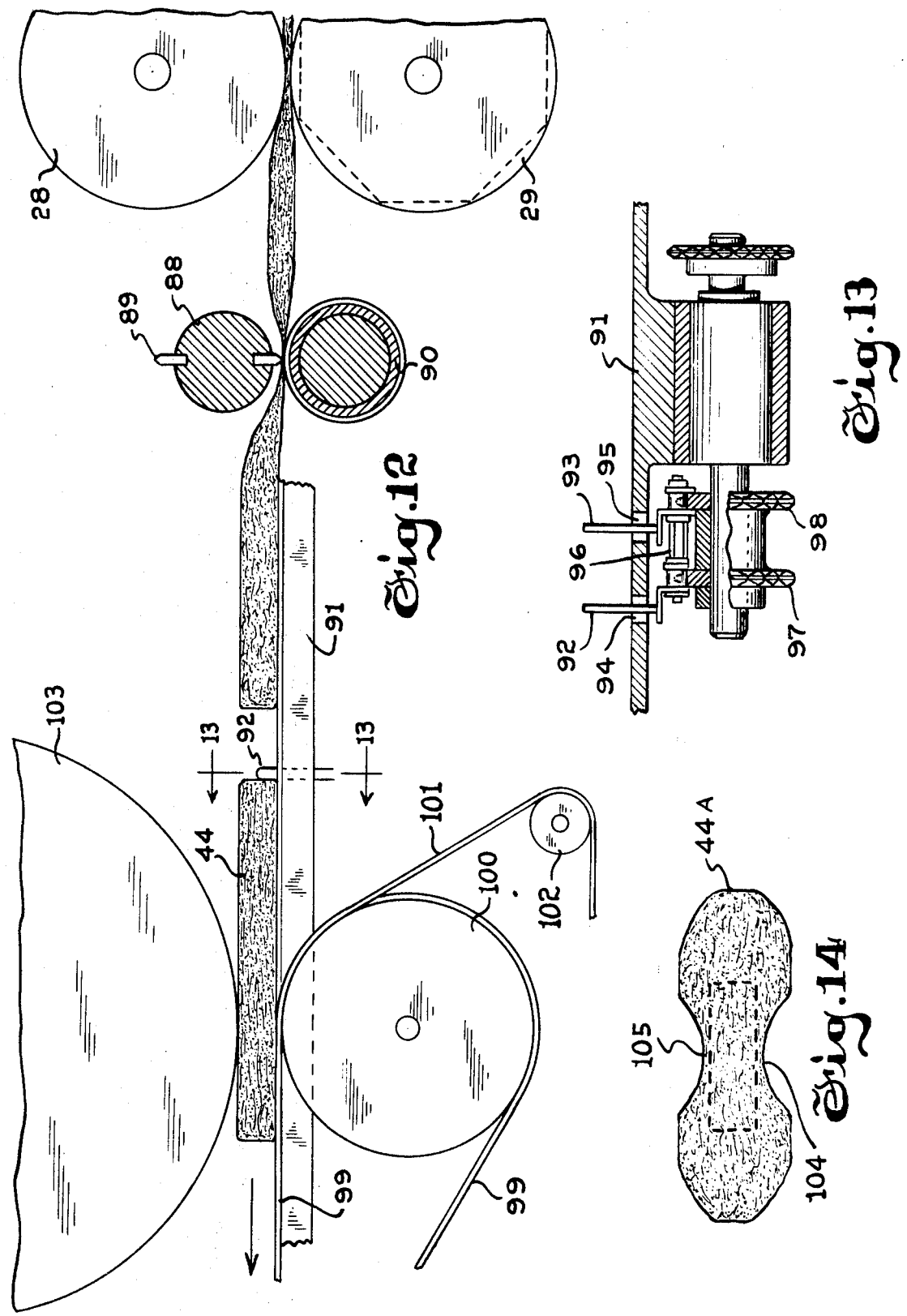

July 7, 1970  C. T. BANKS  3,518,726

MACHINE FOR MAKING SANITARY NAPKINS

Filed Sept. 15, 1967  6 Sheets-Sheet 5

United States Patent Office 3,518,726
Patented July 7, 1970

3,518,726
MACHINE FOR MAKING SANITARY NAPKINS
Charles T. Banks, Neenah, Wis., assignor to Kimberly-Clark Corporation, Neenah, Wis., a corporation of Delaware
Filed Sept. 15, 1967, Ser. No. 668,058
Int. Cl. A61l *15/00*
U.S. Cl. 19—144.5                             4 Claims

ABSTRACT OF THE DISCLOSURE

A sanitary napkin manufacturing machine comprising a source of fluff and a drum having compartments in its periphery which have perforated bottoms that are connected with a source of suction for accumulating the fluff within the compartments, a source of compressed and embossed fluff segments mechanically arranged to discharge the segments onto the bottoms of the compartments before the fluff from said source is accumulated in the compartments so as to thereby form internal sanitary napkin pads having the same shape as the compartments and each having one of the compressed segments embedded in the active face thereof.

---

The invention relates to sanitary napkins and more particularly to internal pads for such napkins and to machines and methods for making such pads.

Sanitary napkins in common usage ordinarily include an internal pad wrapped with gauze, with the gauze protruding from the ends of the pad so as to form fastening tabs. The internal pad is made up of a plurality of layers of wrapped tissue or wadding and perhaps layers of other absorbent materials, as well as barrier sheets of polyethylene film or the like.

It is an object of the present invention to provide an improved sanitary napkin having an internal pad which has a compressed fluff segment embedded in the active face thereof, and it is also an object of the invention to provide an improved machine for making such pads.

In a preferred form, the machine of the invention includes a rotary drum having a series of compartments in its outer periphery which have perforated bottoms, a fluff making unit connected to supply air-borne fluff to the compartments as the drum revolves, means for providing suction on the bottoms of the compartments so that the fluff is collected in the compartments, mechanism for providing compressed and embossed segments of fluff and for positioning one of the segments on the bottom of each of the compartments prior to the disposition of fluff as aforesaid in the compartments, so as to thereby form internal sanitary napkin pads of the same shape as the compartments and each of which has one of the compressed fluff segments embedded in a face of the pad.

The invention consists of the novel constructions, arrangements and devices to be hereinafter described and claimed for carrying out the above stated objects, and such other objects, as will be apparent from the following description of a preferred form of the invention, illustrated with reference to the accompanying drawings, wherein:

FIG. 1 is a side elevational view partly in section of a fluff making and fluff depositing portion of the machine of the invention;

FIG. 2 is a fragmentary sectional view on an enlarged scale taken on line 2—2 of FIG. 1, and showing a fragmentary portion of a fluff collecting drum having a series of compartments in its periphery for collecting fluff to thereby form fluff pads in the shape of the compartments;

FIG. 3 is a sectional view taken on line 3—3 of FIG. 2;

FIG. 4 is a plan view of a peripheral portion of the drum and taken from line 4—4 of FIG. 3;

FIG. 5 is a plan view of a connected series of the fluff pads formed on the drum illustrated in FIGS. 2, 3 and 4;

FIG. 6 is a side elevational view of one of the fluff pads;

FIG. 7 is a side elevational view, partly broken away for better illustration of internal parts, of an assembly for making a strip of fluff for formation of relatively small compressed embossed fluff segments to be positioned on the fluff pads;

FIG. 8 is a sectional view taken on line 8—8 of FIG. 7;

FIG. 9 is a side elevational view of mechanism for embossing and cutting the fluff strip for producing the individual segments and for rounding the ends of the segments, and including an embossing roll and a cooperating press roll and also including a pair of squeeze rolls;

FIG. 10 is a plan view of the squeeze rolls;

FIG. 11 is an end view of the embossing and cooperating press rolls shown in FIG. 9;

FIG. 12 is a side elevational view of mechanism for applying gauze onto the pads;

FIG. 13 is a sectional view taken on line 13—13 of FIG. 12;

FIG. 14 is a plan view of a modified form of pad;

FIG. 15 is a view similar to FIG. 4 but showing a modified fluff collecting compartment in the fluff collecting drum for providing pads of the form shown in FIG. 14;

Like characters of reference designate like parts in the several views.

Figure 16:
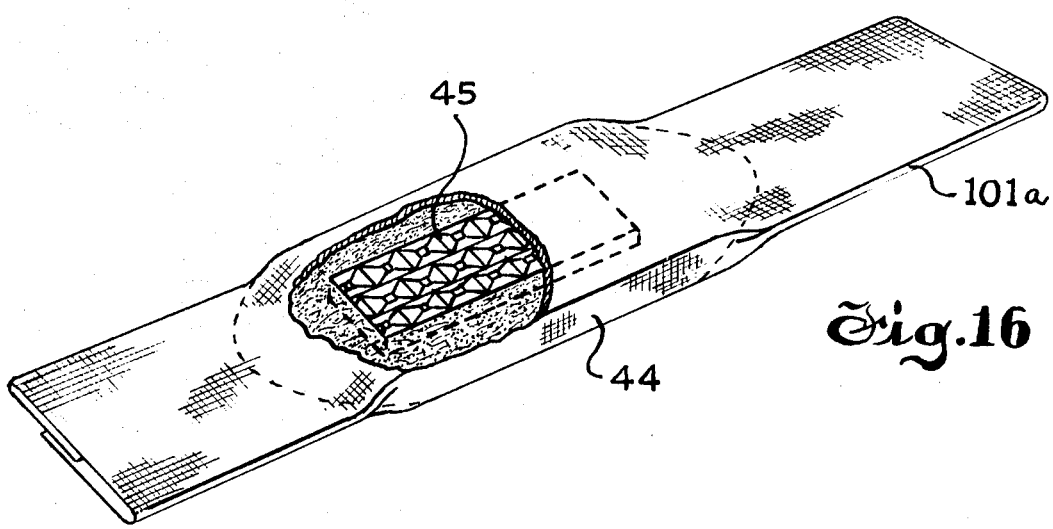
FIG. 16 is a perspective view of a completed sanitary napkin including a fluff pad having a compressed fluff segment embedded therein and enwrapped in a gauze envelope; and, FIG. 17 is a perspective view of one of the compressed fluff segments.

Referring now to the drawings and in particular to FIG. 1, the illustrated sanitary pad making machine may be seen to comprise a fluff forming assembly having a central rotor or picker roll 15 and a stator 16 extending around the rotor 15. The rotor 15 is provided with a multitude of needles 17 protruding outwardly from its periphery, and the stator 16 is provided with a similar multitude of needles 18 extending inwardly toward the center of rotation of the rotor 15. There is only a small gap between the outer ends of the needles 17 and the inner ends of the needles 18, such as for example, a .04 inch gap.

The fluff is formed from a roll 19 of pulp which is disposed on a rotatable spindle 20. The pulp may, for example, be wound in a strip 21, eigth inches wide and ⅟₁₆ to ⅛ inch thick, and is composed practically completely of wood fibers that have been dried and formed into web form. The pulp may, for example, be bleached kraft pulp or may be sulfite or sulfate processed pulp. Pairs of fluted feed rolls 22, 23, 24 and 25 are provided for feeding the pulp strip 21 toward the rotor 15, and a support 26 is provided for the pulp strip adjacent the ends of the needles 17 on the rotor 15 so that the pulp strip 21 may be fed into the needles 17 to be thereby disintegrated between them and the needles 18.

The rotor 15 and stator 16 are enclosed in a housing 27, an open end of which is very nearly closed by means of a pair of drums 28 and 29. The drums 28 and 29 are so disposed that their peripheries approach quite close to each other, as shown.

The drum 29 is arranged with a series of cavities or compartments 30a, 30b, 30c, 30d, etc., on its periphery (see FIGS. 2, 3 and 4). The drum 29 comprises a pair of end discs 31 and 32 and a pair of internal discs 33 and 34, all of which are supported by means of a central shaft 35. External cyclindrical portions 36 and 37 connect the discs 31 and 33 and the discs 34 and 32, respectively.

Each of the compartments 30a, 30b, etc., is formed by side plates 38 and 39 and a perforated plate 40 extending between the side plates 38 and 39. The plate 40 is planar and has a multitude of small holes 41 extending through it; and it wall be observed from FIG. 4 that the holes 41 are spaced relatively far from each other adjacent the ends of the compartment, while the holes are spaced relatively close together toward the centers of the compartment. The side plates 38 and 39 are spaced equidistantly apart for most of the length of the compartment and are provided with opposite end portions 39a and 39b and with opposite end portions 38a and 38b that respectively approach each other so that the compartment in plan is in the form of a rectangle with rounded ends. The portions 38a and 39a and also the portions 39b and 38b, while extending toward each other, do not meet so that the compartments 30a, 30b, 30c, etc., are connected at their ends. Due to the fact that the side plates 38 and 39 are arc shaped on the periphery of the drum 29, while the side plates 40 are planar, the compartments are considerably deeper at their centers that at their ends defined by the end portions 38a, 39a, 38b and 39b.

Suction is applied within the drum 29, and this may be accomplished by means of a vacuum box 42 fitting over the open end of the disc 31. The drum 29 on its other end may be closed by any suitable means, as by means of a plate 43, so as to maintain vacuum conditions with the drum. As will be hereinafter described in greater detail, as the drum 29 rotates, fluff collects in the compartments 30a, 30b, 30c, etc., due to the vacuum conditions in the drum 29, so as to provide a connected series of fluff pads 44. These pads 44 are shown in FIGS. 5 and 6 and have the same shape as the compartments 30a, 30b, etc., and are of greater thickness at their centers than at their ends due to the arcuate external shapes of the plates 38 and 39 of each compartment.

The pads 44 may be used when separated from each other in their conditions as above described as the internal parts of sanitary napkins; however, preferably, a compressed segment 45 is provided embedded in one of the flat faces of a pad 44 which would be the active face or that face in contact with the body of the wearer except for the gauze wrapping of the sanitary napkins.

The segments 45 may be formed by means of the apparatus illustrated in FIGS. 7 to 11. This apparatus comprises a fluff forming assembly including a rotor 46 made up of a series of triangular plates 47 fixed on a rotary shaft 48. A stator 49 extends around the rotor 46 and comprises a plurality of triangular plates 50 so fixed with respect to each other as to have apexes projected toward the shaft 48 and located in close proximity to the outer apexes of the plates 47.

Fluted feed rolls 51, 52, 53 and 54 are provided for feeding a strip 55 of pulp from a roll 56 of the pulp toward the rotor 46, and a platen element 57 is provided for supporting the pulp strip adjacent the apexes of the plates 47. The pulp of the strip 55 may be of the same type as the pulp of the strip 21 and which has been above described.

The rotor and stator acting together provide disintegrated pulp fibers, and these are collected within a housing 58. Negative pressure is maintained within the housing 58 from forming drums 59 and 60 in the housing in which a negative pressure is likewise maintained. The forming drum 59 is composed of a cylinder of perforated sheet material 61 mounted on a rotatable stub shaft 62 and on a rotatable rim 63. A suitable vacuum box (not shown) is in communication with the central opening through the rotatable rim 63 for maintaining vacuum in the forming drum 59.

A plate 64 including an end closure plate portion 64a extends across and within the forming drum 59 and is sealed with respect to the inner surface of the forming drum by means of seals 65. The arrangement is such, therefore, that only about one-half of the forming drum 59 has suction applied to it, namely that one-half is communication with the interior of the housing 58.

The construction of the forming drum 60 is substantially the same as that of the drum 59, and the drum 60 also has only its portion in communication with the interior of the housing 58 under suction conditions.

The forming drums 59 and 60 collect fluff on their exterior surfaces, and this fluff is discharged from between the drums 59 and 60 in the form of a continuous batt 66. A pair of rolls 67 and 68 are provided for receiving the batt 66, and a squeezer assembly comprising a pair of rolls 69 and 70 is provided for indenting the batt at spaced places. The rolls 69 and 70 have triangularly shaped, blunted squeezing elements 71 fixed to them on their outer peripheries for this purpose.

The batt 66, after passing between the rolls 69 and 70, passes through an embossing assembly which includes a pair of rolls 72 and 73. The roll 72 is provided on its periphery with a series of pyramidal-shaped projections 74, and the roll 73 has a smooth drum portion 75 on its periphery which is located opposite to the projections 74. The rolls 72 and 73 thus act to provide a pattern of pyramidal-shaped depressions in the batt 66 into the individual segments 45.

The batt 66 is cut at the places in which it has been squeezed by the squeezing elements 71, and this cutting is by means of knives 76 fixed within a roll 77. A roll 78 is disposed below the rolls 77, and the knives 76 coacting with the exterior surface of the roll 78 cut the batt 66 into the individual segments 45.

The apparatus for making the embossed fluff segments 45 is much like that described in my previously filed patent application for "Apparatus and Method for Making Sanitary Napkins," Ser. No. 621,015, filed Mar. 6, 1967 assigned to the same assignee as the present invention. For additional details of the embossed fluff segment making apparatus, this prior filed application may be referred to, and, therefore, additional detail is not deemed necessary herein.

A pair of pull rolls 79 and 80 (see FIGS. 1 and 9) are provided adjacent the rolls 77 and 78 for pulling the segments 45 individually from the latter rolls, and a pair of belts 81 and 82 are provided for receiving the segments 45 between them and for transmitting them onto the exterior surface of the drum 29. The belts 81 and 82 may be supported by any suitable supporting rolls, such as by means of rolls 83, 84 and 85 for the belt 81, and by means of rolls 86 and 87 for the belt 82. The rolls 83 and 87 are positioned adjacent the periphery of the drum 29 and below the housing 27 so that an embossed segment 45 is positioned on the perforated plate 40 of each compartment 30a, 30b, 30c, etc., prior to the disposition of fluff from the picker roll 15 onto the surface of the drum 29.

The pads 44, with the fluff segments 45 on their lower faces, issue in connected form from between the drums 28 and 29; and the pads 44 are cut apart by means of a cutter assembly (see FIG. 12) which comprises an upper roll 88 having outwardly extending knives 89 carried by it and a lower roll 90 with which the knives 89 cooperate. After the pads 44 have thus been severed from each other, they issue from between the rolls 88 and 90 onto a table 91, and they are propelled along the table 91 by means of any suitable pusher device, such as by means of pusher pins 92 and 93 projecting through slots 94 and 95 in the table 91. The pins 92 and 93 are carried by a chain 96, and the chain is mounted on and travels along with suitable sprockets 97 and 98.

A conveyor belt 99 extending around a plurality of rolls, such as the roll 100, is provided for receiving the pads 44 after cutting, each of them having a segment 45 disposed in its lower face. A gauze web 101 travels from a suitable source of supply of the web and around a guide roll 102 onto the upper surface of the belt 99 as supported by the roll 100; and, therefore, as the individual pads 44 are moved onto the upper surface of the belt 99, they are, at the same time, moved onto the gauze web 101. A roll 103 is preferably provided above the roll 100 for slightly compressing the individual pads 44 as they reach the belt 99.

Although a pusher device of any suitable type may be utilized for pushing the individual pads 44 onto the belt 99, suitable pushing apparatus of the type illustrated in FIGS. 12 and 13 is included in the disclosure of my prior application, Ser. No. 621,015, and this application may be referred to for details of such apparatus.

The gauze web 101, after passing onto the belt 99, is subsequently folded around the individual pads 44, and it is pleated and severed between the individual pads so as to from the individual napkins, each comprising an inner pad 44 enclosed in a segment of gauze; and details of suitable mechanism for folding the gauze and for completing the napkins are also disclosed in my co-pending application, Ser. No. 621,015, and this application may be referred to for such details.

It will be understood that, if desired, the shape of the pad 44 may be varied such as, for example, to be the shape of the pad 44A shown in FIG. 14, which is narrower in its central region and has inwardly extending depressions 104 and 105 in its marginal edge portions. In order to form a pad of this shape which, although being narrower in its central region is also thicker in the central region than in its end region, it is only necessary to utilize side plates which are correspondingly shaped, such as the side plates 106 and 107, taking the place of the side plates 38 and 39 and having inwardly extending protruding portions 106a and 107a (see FIG. 15).

The gauze wrapped around the pads 44A having the side depressions 104 and 105 should preferably be snugly wrapped around the reduced width central pad portions defined by these depressions, and this may be done by using the mechanism, for example, illustrated in the co-pending application of Richard D. Anderson, Ser. No. 361,436, filed Apr. 21, 1964, now U.S. Pat. 3,344,581 and assigned to the same assignee as the present invention. Sanitary napkins having embossed compressed segments on their active faces are, incidentally, shown in the co-pending application of John C. Bletzinger et al., Ser. No. 443,847, filed Mar. 30, 1965, now U.S. Pat. 3,375,827 assigned to the same assignee as the present invention, and this patent may be referred to for further details of such napkins.

In operation of the machine, the feed rolls 22, 23, 24 and 25 are driven by any suitable driving mechanism so as to pull the pulp strip 21 from the roll 19 and discharge it onto the needles 17 of the rotor 15. The needles 17 acting in conjunction with the needles 18 of the stator 16 disintegrate the pulp strip substantially into its component fibers and the resulting fluff is discharged from between the rotor 15 and stator 16 into the housing 27.

A source of suction is connected to the drum 29, and air thus flows inwardly through the openings 41 in the plates 40 forming the bottoms or inner surfaces of the cavities 30a, 30b, 30c, etc. The drums 28 and 29 are rotated at the same peripheral speeds, and the fluff in the housing 27 collects within the cavities 30a, 30b, 30c, etc., due to the air flowing inwardly of the holes 41. More fluff collects in the central regions of the cavities than in the end regions due to the face that the spacing between the holes 41 is less in the central regions of the plates 40 than in the end regions, and a fluff pad 44 is thus formed in each of the cavities, the pad 44 being thicker in its central region than in its end regions. With the cavities 30a, 30b, 30c, etc. being in the form illustrated in FIG. 4 which is rectangular except for rounded ends, the internal pads have the same outline as the cavities which form molds for the fluff being deposited on the drum 29.

Each of the pads 44 thus formed has a compressed fluff segment 45 on its face in contact with the plate 40 in each of the cavities 30a, 30b, 30c, and the segments 45 are formed using the mechanism illustrated in FIGS. 7 to 11. Fluff for the segments 45 is produced using the fluff making assembly illustrated in FIG. 7, and the feed rolls 51, 52, 53 and 54 pull a strip 55 of pulp from the roll 56 and feed it onto the platen element 57 and toward the rotor 46. The outer apexes of the plates 47 which move in close proximity to the inner apexes of the plates 50 disintegrate the pulp strip which is fed to the apexes of the plates 47 and produce fluff within the housing 58.

The drums 59 and 60 have suction applied to them, and they thus collect the fluff on their exterior perforated cylindrical surfaces and feed it from between them in the form of a batt 66. The rolls 67 and 68 cause the batt 66 to move between the squeeze rolls 69 and 70, and the squeezing elements 71 produce inwardly extending depressions in the marginal side edge portions of the batt 66. The batt 66 continues its travel between the rolls 72 and 73, and the projections 74 produce pyramidal-shaped cavities in the upper surface of the batt 66. The batt 66 is then cut into individual segments by the knives 76, and the knives are so effective at the points along the batt 66 at which the squeezing elements 71 have been effective so that the segments 45 that are produced have rounded corners. The rolls 79 and 80 are effective to convey the individual fluff segments 45 so that the segments enter between the belts 81 and 82, and these belts transfer the segments onto the surface of the drum 29. The belts are so timed in their movement that an individual segment 45 is positioned in a central location in each of the cavities 30a, 30b and 30c as the drum 29 revolves so that the fluff from the housing 27 is deposited on top of the segments 44 in these cavities.

The pads 44 on the surface of the drum 29 are connected due to the fact that the cavities 30a, 30b, 30c, etc., are in connection, since the side plates 38 and 39 are not completely closed on their ends; and this continuous length of pads 44 passes from between the rolls 28 and 29 through the cutter assembly comprising the rolls 88 and 90. The knives 89 cut the continuous length of pads 44 apart along lines 108 corresponding to the places at which the cavities 30a, 30b, etc., are joined, and the pads move onto the table 91 along which they are propelled by means of the pusher fingers 92 and 93. The gauze 101 passes onto the table 91 along with the belt 99, and the fingers 92 and 93 push the pads 44 between the rolls 100 and 103 and onto the surface of the gauze 101 at such speed that the pads 44 lie along the continuous gauze web 101 in spaced relation. The gauze 101 may then be folded over the pads; it may be sealed at places between the separated pads; and it may then be cut between the pads so as to form the individual sanitary napkins utilizing any suitable mechanism for this purpose, such as, for example, mechanism disclosed in my co-pending application, Ser. No. 621,015, filed Mar. 6, 1967.

An individual sanitary napkin thus manufactured is illustrated in FIG. 16 and may be seen to comprise a fluff pad 44 which is relatively uncompressed and has a relatively heavily compressed segment 45 (see FIG. 17) embedded in one face. The pad 44, with the compressed segment 45 embedded in one face, is enwrapped in a gauze envelope 101a; and the top face of the pad 44 having the segment 45 embedded therein is considered to be the active face which is in contact with the perineal area of the wearer except for the gauze envelope 101a covering the top face of the pad.

Figure 17:
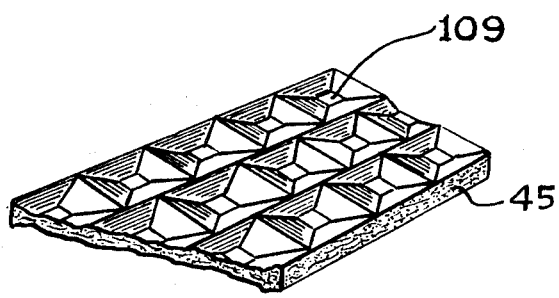

The projections 74 on the embossing roll 72 are illustrated to be pyramidal-shaped, and they therefore provide pyramidal-shaped depressions 109 in the segment 45 (see FIG. 17). Since the segment 45 is compressed while the pad 44 has had substantially no compression, the densities of the segment 45 and of the pad 44 are substantially different. The density of the pad 44 may, for example, be within 1.5 pounds per cubic foot to about 2.5 pounds per cubic faot while the density of the segment 45 may range from as low as about 5 pounds per cubic foot at the lowest point of compression to as high as about 100 pounds per cubic foot at the highest point of compression. An average density in the range of about 7.5 pounds per cubic foot to about 50 pounds per cubic foot is preferred. The relative thicknesses of the segment 45 and of the pad 44 are not particularly critical; however, the segment 45 may, for example, be about 5/16 inch thick and the pad 44 may be about 1/2 inch to 5/8 inch thick in its central region. Using a pattern of compression, as by the pyramidal-shaped projections 74, it will be understood that the density and therefore the sizes of the internal pores of the segment 45 will vary from point to point.

Fluid which is introduced into an absorptive element such as the segment 45 migrates more rapidly through densified areas with small size pores than it does through areas of less density having larger pores. When pyramidal-shaped projections 74 are used, they provide spaced apart cup-like depressions 109 whereby the segment is substantially densified in the central areas of the depressions, in particular, while being relatively uncompressed in the intervening areas. Particularly in the densified areas, the pores within the segment 45 are reduced in size; and, since the pad 44 is relatively uncompressed, it has substantially larger pores. The pad 44 as a whole, however, since it is relatively uncompressed, is relatively soft and flexible while the segments 45 are harder and not so flexible. The pad, as a whole, therefore, is relatively soft and flexible and it has a flat active face.

In use, when fluid strikes a compressed segment 45 embedded in a pad 44, the contacted area immediately expands and the pores in the wetted area become larger. The fluid then is drawn to the immediately adjacent pores which also expand, and the fluid then spreads and moves through the segment in a continuous flow pattern from the source point of the fluid as long as fluid is being supplied. Eventually, fluid transfers from the segment 45 to the pad 44; and this continues as long as fluid is supplied. Although the shapes and relative dispositions of the embossing projections 74 on the wheel 72 may be changed, it is preferred that the embossing wheel 72 shall be such as to produce the compressed areas 109 in adjacent rows and staggered with respect to each other. With this staggered relationship, it has been found that fluid migrates very easily from one compressed area 109 to another in adjacent rows, diagonally across the segment 45. The compression of the areas 109 apparently reduces the capillary voids in cross section within the segment 45 causing migration of fluid to occur particularly internally of and on the embedded underface of the segment 45 between compressed areas 109, leaving the outer, less compressed surfaces drier. Since the fluid travels relatively fast diagonally of the segment 45, particularly with the staggered pyramidal-shaped depressions 109, the liquid is drawn substantially to the ends of the segment 45 relatively fast, so that the liquid is distributed along the length of the pad 44 rather than only in the center whereby to give a greater fluid capacity of the sanitary napkin assembly than would otherwise be obtainable.

I wish it to be understood that the invention is not to be limited to the specific constructions and arrangements shown and described, except only insofar as the claims may be so limited, as it will be understood to those skilled in the art that changes may be made without departing from the principles of the invention.

I claim:

1. In a machine for making sanitary napkins, means for providing a current of airborne separated fibers, a drum disposed to have its periphery exposed to said current of fibers and having a plurality of compartments on its periphery each defined by a pair of opposite side plate portions and a bottom or inner plate which has a pattern of openings therethrough, and means for applying suction to the inner surfaces of said bottom plates so that the fibers in said current collect on the bottom plate and between said side plate portions of each compartment to form sanitary napkin pads of fluff made of said fibers, said side plate portions in central regions thereof extending axially of said drum toward each other so that the central region of each pad is narrower than end regions of the pad.

2. In a machine for making sanitary napkins, means for providing a current of airborne separated fibers, a drum disposed to have its periphery exposed to said current of fibers and having a plurality of compartments on its periphery each defined by a pair of opposite side plate portions and a bottom or inner plate which has a pattern of openings therethrough, and means for applying suction to the iner surfaces of said bottom plates so that the fibers in said current collect on the bottom plate and between said side plate portions of each compartment to form sanitary napkin pads of fluff made up of said fibers, said compartments being deeper in central regions thereof than in their end regions and said pattern of openings in each of said bottom plates including relatively closely spaced openings in the central region of the compartment and relatively remotely spaced openings in the end regions of the compartment so that more fibers are drawn to the central region than to the end regions for providing a pad that is thicker in the central region than in end regions.

3. In a machine for making sanitary napkins, means for providing a current of airborne separated fibers, a drum disposed to have its periphery exposed to said current of fibers and having a plurality of compartments on its periphery each defined by a pair of opposite side plate portions and a bottom or inner plate which has a pattern of openings therethrough, means for applying suction to the inner surfaces of said bottom plates so that the fibers in said current collect on the bottom plate and between said side plate portions of each compartment to form sanitary napkin pads of fluff made up of said fibers, said compartments being connected peripherally of the drum so that the pads formed in consecutive ones of said compartments are connected, and means for cutting the connected pads along lines between adjacent pads so as to separate the pads.

4. In a machine for making sanitary napkins, means for providing a current of air borne separated fibers, a drum disposed to have its periphery exposed to said current of fibers and having a plurality of compartments on its periphery each defined by a pair of opposite side plate portions and a bottom or inner plate which has a pattern of openings therethrough, means for applying suction to the inner surfaces of said bottom plates so that the fibers in said current collect on the bottom plate and between said side plate portions of each compartment to form sanitary napkin pads of fluff made up of said fibers a second means for providing a current of airborne separated fibers, means for collecting fibers from said second means and putting them into strip form, means for embossing said strip, means for cutting said strip into segments, and means for depositing one of said segments in each of said compartments of said drum prior to the disposition thereon of fibers from said first named fiber providing means so that the resulting pads have the segments embedded in one face.

References Cited

UNITED STATES PATENTS

| | | | |
|---|---|---|---|
| 2,073,329 | 3/1937 | Winter | 19—144.5 |
| 2,282,477 | 5/1942 | Joa | 19—144.5 |
| 2,600,882 | 6/1952 | Kellett et al. | 128—290 |

DORSEY NEWTON, Primary Examiner